(12) United States Patent
Kabir et al.

(10) Patent No.: US 11,915,108 B2
(45) Date of Patent: Feb. 27, 2024

(54) MATERIAL CHARACTERIZATION SYSTEM AND METHOD

(71) Applicant: The Boeing Company, Chicago, IL (US)

(72) Inventors: Mohammed H. Kabir, Mukilteo, WA (US); Alan Douglas Byar, Issaquah, WA (US); John J. Dong, Bothell, WA (US); Naveed Moayyed Hussain, Palos Verdes Peninsula, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/444,739

(22) Filed: Aug. 9, 2021

(65) Prior Publication Data

US 2022/0051141 A1 Feb. 17, 2022

Related U.S. Application Data

(60) Provisional application No. 63/065,236, filed on Aug. 13, 2020.

(51) Int. Cl.
*G06N 20/00* (2019.01)
*G01N 3/08* (2006.01)

(52) U.S. Cl.
CPC .............. *G06N 20/00* (2019.01); *G01N 3/08* (2013.01)

(58) Field of Classification Search
CPC .. G06N 20/00; G01N 3/08; G01N 2203/0216; G01N 2203/0218; B64F 5/60
See application file for complete search history.

(56) References Cited

U.S. PATENT DOCUMENTS

| 8,234,093 | B2 | 7/2012 | Glancaspro et al. | |
|---|---|---|---|---|
| 9,689,783 | B2 | 6/2017 | Dietrich et al. | |
| 2019/0003944 | A1* | 1/2019 | Li | G01N 3/32 |
| 2021/0405613 | A1* | 12/2021 | Garcia Albert | G06N 3/04 |

OTHER PUBLICATIONS

"Advisory Circular," U.S. Department of Transportation, Federal Aviation Administration, Sep. 2009, 37 pages.
Mouritz, "Mechanical and durability testing of aerospace materials," Introduction to Aerospace Materials, 2012, pp. 91-127.
Olivares, "Experimental 'Building Block Approach' to Support the Crashworthiness Evaluation of Composite Aircraft Structures," 2011 FAA/EASA/Industry Composite Transport, May 2011, 19 pages.
Jian et al., "Study on Airworthiness Requirements of Composite Aircraft Structure for Transport Category Aircraft in FAA," Procedia Engineering, 2011, pp. 270-278.
Uzun et al., "Design of a Hybrid Digital-Twin Flight Performance Model Through Machine Learning," 2019 IEEE Aerospace Conference, Mar. 2019, pp. 1-14.

* cited by examiner

*Primary Examiner* — Walter L Lindsay, Jr.
*Assistant Examiner* — Geoffrey T Evans
(74) *Attorney, Agent, or Firm* — Yee & Associates, P.C.

(57) ABSTRACT

A method, apparatus, system, and computer program product for estimating material properties. Training data comprising results of testing samples for a set of materials over a range of loads applied to the samples is identified by a computer system. A machine learning model is trained by the computer system to output the material properties for materials in structures using the training data.

20 Claims, 9 Drawing Sheets

MATERIAL CHARACTERIZATION SYSTEM AND METHOD

RELATED PROVISIONAL APPLICATION

This application is related to and claims the benefit of priority of provisional U.S. Patent Application Ser. No. 63/065,236, entitled "Material Characterization System and Method", filed on Aug. 13, 2020, which is hereby incorporated by reference.

BACKGROUND INFORMATION

1. Field

The present disclosure relates generally to manufacturing products and, in particular, to a method, apparatus, and system for characterizing materials used to manufacture products.

2. Background

In designing and manufacturing parts, materials are selected for manufacturing the parts. Material properties for the materials describe the material under load and are useful in engineering an object such as an aircraft, a bridge, a vehicle, a dam, or other types of structures. The material properties can be estimated by coupon testing. One type of design process involves testing specimens of materials and using those results to create a model of an object. This type of process is referred to as a Building Block Approach (BBA), which reduces a number of large-scale tests such as those for completed wing assemblies, fuselages, or other structures. These large-scale tests can be expensive.

With this approach, coupons are evaluated through applying a load and measuring the displacement or other results of applying the load. This type of testing, however, is time-consuming and tedious. Coupon testing involves performing numerous tests on many coupons to determine material properties. For example, hundreds of thousands of tests may be performed to determine the material properties for use in selecting materials for an aircraft structure used in an aircraft.

Therefore, it would be desirable to have a method and apparatus that take into account at least some of the issues discussed above, as well as other possible issues. For example, it would be desirable to have a method and apparatus that overcome a technical problem with determining material properties of materials for use in a structure.

SUMMARY

An embodiment of the present disclosure provides a method for estimating material properties. A computer system is used to identify training data in which the training data comprises results from at least one of physical testing of test coupons for a set of materials over a range of loads from before and after ultimate stresses or a virtual testing of the test coupons for the set of materials over the range of loads from before and after the ultimate stresses are applied to the test coupons. The computer system is used to train a machine learning model to output material properties using the training data.

Another embodiment of the present disclosure provides a system for estimating material properties with a machine learning model trained using the previously-mentioned method. The system comprises a computer system and the machine learning model in the computer system, which is configured to output a set of the material properties for a structure.

Still another embodiment of the present disclosure provides a material properties analysis system comprising a computer system and a machine learning model in the computer system. The machine learning model has been trained using training data comprising results of testing test coupons for a set of materials over a range of loads applied to the test coupons. The machine learning model is configured to output a set of material properties for a structure.

Yet another embodiment of the present disclosure provides a computer program product for estimating material properties. The computer program product comprises a computer-readable storage media with first program code and second program code stored on the computer-readable storage media. The first program code is executable by a computer system to cause the computer system to identify training data comprising results of testing test coupons for a set of materials over a range of loads applied to the test coupons. The second program code is executable by the computer system to cause the computer system to train a machine learning model to output material properties using the training data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
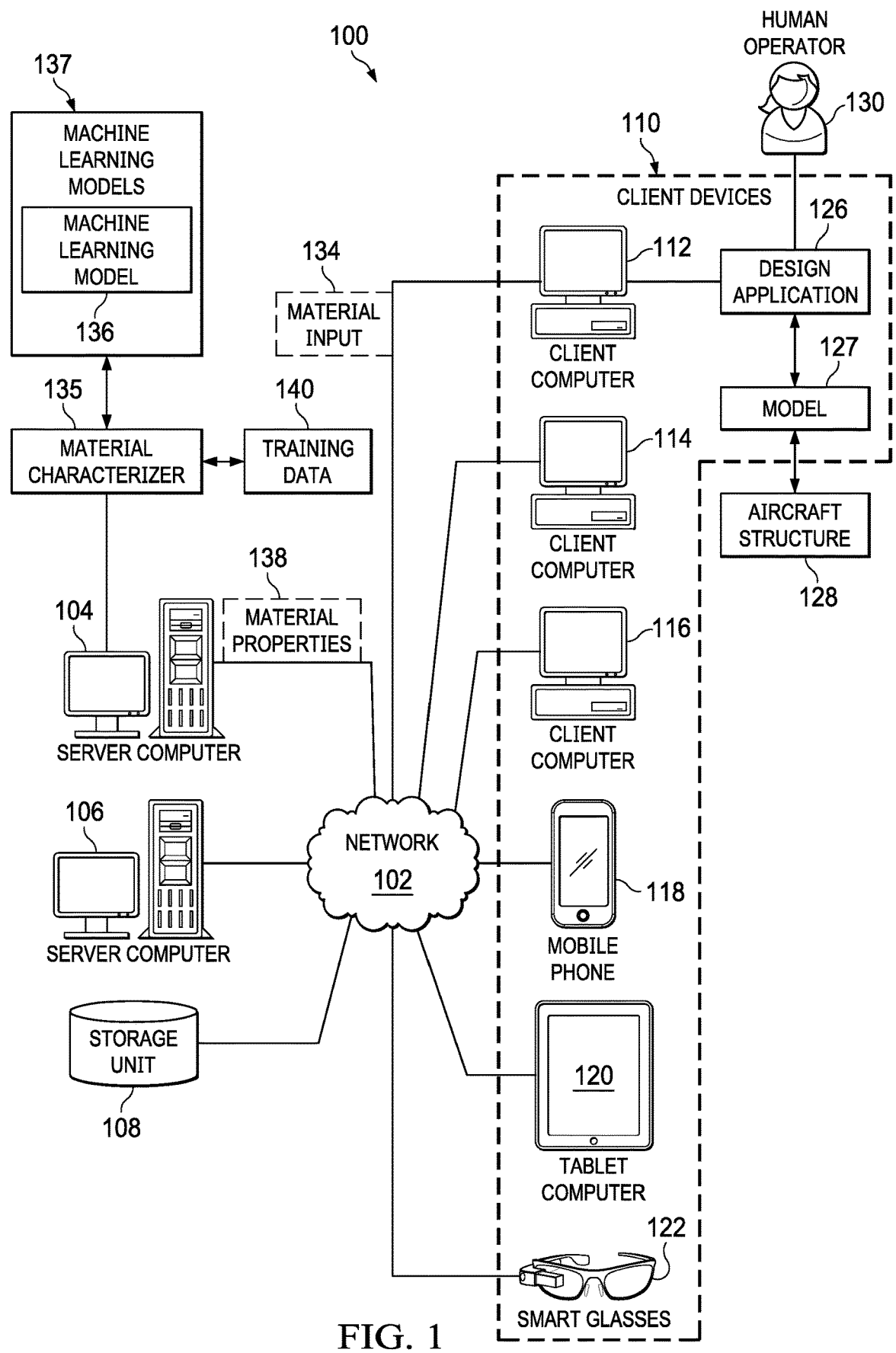
FIG. 1 is a pictorial representation of a network of data processing systems in which illustrative embodiments may be implemented.

The illustrative embodiments recognize and take into account one or more different considerations. For example, the illustrative embodiments recognize and take into account that, currently, material properties are determined on a coupon level. The illustrative embodiments recognize and take into account that numerous and extensive tests on test coupons can occur when creating airplane structural analysis and simulation models for interior structures or for an airframe structure for an aircraft. For example, the illustrative embodiments recognize and take into account that seat certification analysis is performed for seats in an interior of an airplane. With respect to the airframe structure, the illustrative embodiments recognize and take into account that bird strikes and unintended ground impact modeling are performed. Over one hundred thousand tests can be performed on the coupons to obtain the material properties for use in modeling an interior airplane structure or the airframe structure.

The illustrative embodiments recognize and take into account that most mechanical systems may comprise components built from different materials. The illustrative embodiments recognize and take into account that material characterizations for different materials are also different. For example, the illustrative embodiments recognize and take into account that tests can be different between components comprised of metal and metal alloys as compared to components that are comprised of composites. For example, the illustrative embodiments recognize and take into account that material property data beyond ultimate stress or failure strain may be needed for materials in the form of metals for metal alloys.

The illustrative embodiments recognize and take into account that additional tests may also be needed to determine material properties for these types of materials. The illustrative embodiments recognize and take into account that testing can be performed to obtain the material properties of the materials in a non-linear response region. The illustrative embodiments recognize and take into account that in the non-linear response region, inconsistencies occur under loading conditions in which a reduction in an ability to carry a load occurs. With composite materials, the illustrative embodiments recognize and take into account that composite damage propagation estimation and a number of damage parameter tests are needed to determine the material properties for the composite materials.

The illustrative embodiments recognize and take into account that it would be desirable to obtain material properties for materials without the extensive tests that are currently performed. Thus, the illustrative embodiments provide a method, apparatus, system, and computer program product for estimating material properties. In one illustrative example, a method outputs material properties. A computer system identifies training data comprising results of testing samples for a set of materials over a range of loads applied to the samples. A machine learning model is trained by the computer system to output the material properties for structures using the training data. This training enables obtaining outputs of the material properties for the structures with reduced testing as compared to current techniques.

In another illustrative example, a computer system identifies training data comprising results from at least one of a physical testing of test coupons for a set of materials over a range of loads from before and after ultimate stresses, or a virtual testing of the test coupons for the set of materials over the range of loads from before and after the ultimate stresses are applied to the test coupons. The computer system trains a machine learning model to output material properties using the training data.

As used herein, a "set of," when used with reference to items, means one or more items. For example, a "set of materials" is one or more materials. For example, when more than one material is present in the set of materials, these materials are different types of materials in the illustrative example.

In this illustrative example, the machine learning model can output material properties for a material of interest without performing tests on test coupons. Further, the machine learning model can output the material properties for a material that was not in the training data. The material can take various forms such as, for example, a metal, an alloy, a composite material, or other suitable materials.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, human operator 130 operates design application 126 in client computer 112 to create model 127 for a physical structure such as aircraft structure 128. Model 127 can be used in simulations to analyze and evaluate a design for aircraft structure 128.

In this illustrative example, design application 132 is software and can be, for example, a computer-aided design program or other types of design software that can be used to generate models. Aircraft structure 128 can be, for example, a component or subcomponents for an aircraft. The component can be, for example, a wing or a fuselage section, and the subcomponent can be a stiffened skin panel, a sheer web, or some other suitable subcomponent.

In creating model 127 of aircraft structure 128, human operator 130 can select materials for use in aircraft structure 128. In other words, human operator 130 can select the materials for parts, subassemblies, assemblies, and other components in aircraft structure 128. In selecting the materials, information about the materials, such as material properties, is needed for accuracy in creating model 127 of aircraft structure 128.

In this illustrative example, human operator 130 can select the materials for aircraft structure 128 without extensive physical testing of coupons performed using current techniques. Human operator 130 interacts with design application 126 and inputs information about the materials for aircraft structure 128 to generate material input 134. Material input 134 identifies the materials. For example, material input 134 can include a type of metal, alloy, composite, or some other material that may be used in creating model 127 of aircraft structure 128.

In addition to identifying the material, material input 134 can include information such as orientation of composite layers, a number of composite layers, a purity of a metal or an alloy, dimensions, and other suitable information about the material that can be used in model 127 of aircraft structure 128. Material input 134 can include other information such as testing techniques, environmental conditions for actual usage, expected structural loads, or other information. With this type of additional information used for training data 140, similar parameters can be input when using machine learning model 136.

As depicted, design application 126 sends material input 134 over network 102 to material characterizer 135 in server computer 104. Material characterizer 135 can use machine learning model 136 in server computer 104 to determine material properties 138 for a material of interest for use in model 127 using material input 134. In other illustrative examples, design application 126 and material characterized 135 can be located in the same computer or part of the same application or program.

In this illustrative example, machine learning model 136 has been trained to output material properties 138 using training data 140. Training data 140 comprises results of testing test coupons for a set of materials over a range of loads applied to the test coupons.

In this illustrative example, the set of materials is a single type of material. With this example, machine learning model 136 in machine learning models 137 is trained using training data 140 for a single type of material. Multiple machine learning models can be trained such that each machine learning model is trained to output material properties 138 based on a particular type of material. In other illustrative examples, machine learning model 136 can be trained using training data 140 that comprises results from testing coupons for a set of materials that comprises multiple types of materials.

In this illustrative example, the results of the testing can be from at least one of a physical testing or a simulation of test coupons for different types of materials over a range of loads. With this training, machine learning model 136 is configured to output material properties 138 for aircraft structure 128.

In this illustrative example, machine learning model 136 receives material input 134 and outputs material properties 138 for aircraft structure 128 described in material input 134. In this illustrative example, material properties 138 are mechanical properties. The mechanical properties can include, for example, a strain-stress response for at least one of an arbitrary loading or a loading direction. In this illustrative example, material properties 138 can also include a loading-displacement curve. In this illustrative example, the loading-displacement curve can include at least one of an initial letter response, a gradual accumulation of minor damage, initial failures of fiber or matrix, progressive damage, and a final loss of load-carrying capability.

Further, material properties 138 can also include indirect material properties of interest. These indirect material properties of interest include at least one of fracture toughness, energy dissipation, or other suitable properties. These material properties can be measured, however, they are not measured directly. Instead, these material properties can be calculated from measured stress-strain responses.

As depicted, material properties 138 are sent from material characterizer 135 in server computer 104 over network 102 to design application 126 in client computer 112. Design application 126 uses material properties 138 in creating model 127 of aircraft structure 128. Human operator 130 can repeat this process with additional materials and receive additional material properties output by machine learning model 136. With this information, human operator 130 can perform simulations using model 127 and make decisions about the use of a particular material or materials for aircraft structure 128.

Once human operator 130 has identified a set of materials for aircraft structure 128, actual physical testing can be performed using a smaller number of tests.

With the use of machine learning model 136 to provide material properties 138 for a material of interest, the amount of testing needed to identify materials can be reduced greatly as compared to current techniques for testing the materials. Thus, machine learning model 136 can be a hybrid digital for material characterization in which machine learning model 136 provides a replication of how actual physical structures will perform to output material properties 138 for a particular material or materials in the structure. For example, hundreds of thousands of tests of test coupons to characterize properties of materials and test structures can be reduced to 30 or 50 tests of actual structures using material properties 138 output by machine learning model 136. The tests of the actual structure would be performed in addition to the hundreds of thousands of tests of test coupons. In this manner, the time and expense of testing test coupons can be reduced. Models can be created sooner with the needed material properties to perform simulations to identify suitable materials for aircraft structures.

This process can be used for any type of structure in addition to or in place of aircraft structures. For example, this process can be used to select materials for manufacturing structures for use in other products such as a bridge, a vehicle, a building, or other products.

Figure 2:
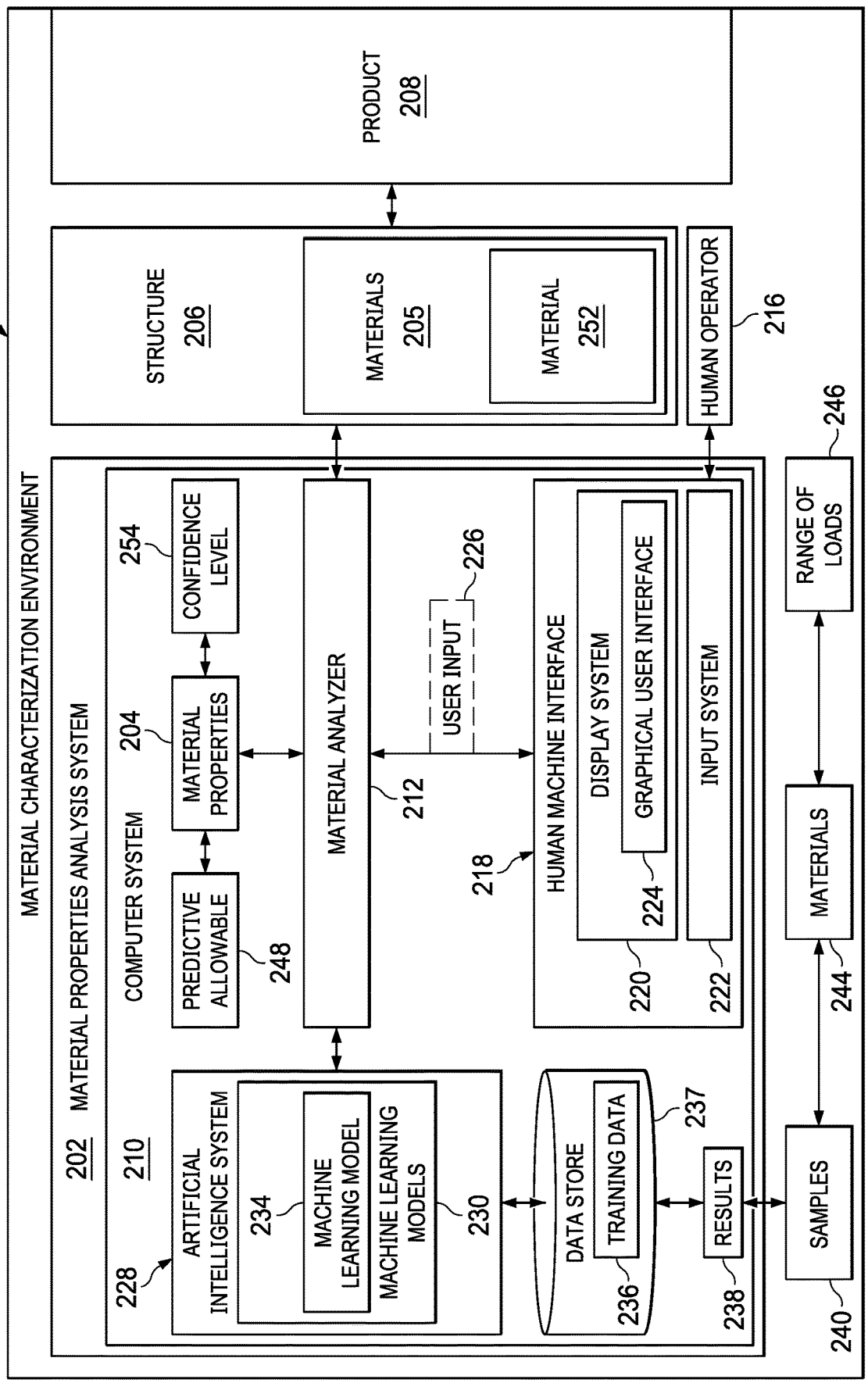
FIG. 2 is a block diagram of a material characterization environment in accordance with an illustrative embodiment.

With reference now to FIG. 2, a block diagram of a material characterization environment is depicted in accordance with an illustrative embodiment. In this illustrative example, material characterization environment 200 includes components that can be implemented in hardware such as the hardware shown in network data processing system 100 in FIG. 1.

In this illustrative example, material properties analysis system 202 can output material properties 204 for materials 205 in structure 206. In other words, material properties analysis system 202 can output material properties 204 for a set of materials 205 that may be used in structure 206.

In this illustrative example, material properties 204 can include at least one or more mechanical properties such as a stress and strain response, a failure strain, a failure strain to rupture, a load displacement, a fracture toughness, an energy dissipation, a density, a Young's modulus, a Poisson ratio, an ultimate strength, a yield strength, a percentage of elongation, or other properties for structure using the material.

For example, material properties 204 can be especially useful in providing an output of properties of a particular material in a non-linear region of stress and strain for the particular material. In this illustrative example, these material properties can be derived directly from measurements or indirectly through calculations based on the measurements.

Structure 206 can take a number of different forms. Structure 206 can be for product 208. Structure 206 can be a component in product 208, or structure 206 can be product 208, depending on the level and complexity of analysis. Product 208 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, a surface ship, a tank, a personnel carrier, a train, a spacecraft, a space station, a satellite, a submarine, an automobile, a power plant, a bridge, a dam, a house, a manufacturing facility, a building, a chair, a passenger seat, an engine housing, a skin panel, a door, a fastener, a bolt, a spring, a seal, and other suitable types of products.

In this illustrative example, material properties analysis system 202 comprises computer system 210 and material analyzer 212 which is located in computer system 210. Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system. For example, computer system 210 can include one or more computers shown in network data processing system 100 in FIG. 1.

In this illustrative example, human operator 216 can interact with material analyzer 212 through human machine interface (HMI) 218. In this illustrative example, human machine interface 218 comprises display system 220 and input system 222.

Display system 220 is a physical hardware system and includes one or more display devices on which graphical user interface 224 can be displayed. The display devices can include at least one of a light emitting diode (LED) display, a liquid crystal display (LCD), an organic light emitting diode (OLED) display, a computer monitor, a projector, a flat panel display, a heads-up display (HUD) such as smart glasses 122 in FIG. 1, or some other suitable device that can output information for the visual presentation of information.

As depicted, human operator 216 is a person that can interact with graphical user interface 224 through user input 226 generated by input system 222 for computer system 210. Input system 222 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, material analyzer 212 outputs a set of material properties 204 for structure 206 using artificial intelligence system 228. As depicted, artificial intelligence system 228 is a system that has intelligent behavior and can be based on the function of a human brain. Artificial intelligence system 228 comprises at least one of an artificial neural network, a cognitive system, a Bayesian network, a fuzzy logic, an expert system, a natural language system, or some other suitable system. Machine learning is used to train artificial intelligence system 228. Machine learning involves inputting data into the process and allowing the process to adjust and improve the function of artificial intelligence system 228.

In this illustrative example, artificial intelligence system 228 can include machine learning models 230. Machine learning model 234 in machine learning models 230 is a type of artificial intelligence model that can learn without being explicitly programmed. Machine learning model 234 can learn based on training data 236 input into machine learning model 234.

In this illustrative example, training data 236 is stored in data store 237. Data store 237 is a repository for storing collections of data such as training data 236. Data store 237 may be in a single location or may be distributed in multiple locations. Data store 237 may be located in at least one of a server computer, a storage system, a cloud computing platform, or in some other suitable storage construct.

In the illustrative example, one or more of machine learning models 230 are trained to output material properties 204 for structure 206. Training data 236 can comprise results 238 of testing samples 240 for a set of materials 244 over range of loads 246 applied to samples 240. In this illustrative example, a set of materials 244 is one or more types of materials 244 and can be at least one of a metal, a composite, a metal alloy, the composite with a different matrix, the composite with a different matrix with different fiber orientations, or other types of materials.

As a result, material analyzer 212 can determine a set of material properties 204 for structure 206 using machine learning model 234 trained using training data 236. In this example, the determination of the set of material properties 204 is an estimate of material properties 204 made using machine learning model 234 in machine learning models 230.

When machine learning model 234 is trained using training data 236 for a single type of material in the set of materials 244, other machine learning models in machine learning models 230 can be trained using other types of materials in materials 244. As a result, each machine learning model 234 in machine learning models 230 can be trained using training data 236 for a different type of material in materials 244. In other illustrative examples, machine learning model 234 can be trained using training data 232 for different types of materials 244.

For example, machine learning model 234 can be trained using training data 236 generated using samples that include a metal sample and a composite sample. In some illustrative examples, both a metal and a composite are in the sample. These combinations may be used in generating training data 236. This selection of materials 244 can be made when structure 206 is manufactured from different types of materials.

In the illustrative example, machine learning models 230 can output an estimate of material properties, actual material properties, or both. The type of output generated by machine learning model 234 in machine learning models 230 depends on training data 236 used to train machine learning model 234.

In one illustrative example, machine learning model 234 in machine learning models 230 estimates material properties 204. In other words, material properties 204 output by machine learning model 234 are not expected to be 100 percent accurate. Material properties 204 output by machine learning model 234 are an estimate that can have some expected error. This error can be the range or band such as, for example, plus or minus 10 percent. The amount of air in material properties 204 can vary depending on the extensiveness of training data 236.

In the illustrative example, an actual material property can be output by machine learning model 234 when sufficient test data is generated for use in training data 236. The amount of training data 236 may contain an amount of test data such that material properties 204 output by machine learning model 234 no longer change with additional testing.

In one illustrative example, the actual material property output as material properties 204 by machine learning model 234 is an average of the actual material properties. Further, in the illustrative example, any given physical part may vary from the design of that part.

For example, the variation may occur because of at least one of a manufacturing inconsistency, a process inconsistency, an age of a material, or other factors. As a result, training data 236 can be generated for a particular material using samples 240 that have variations for the same material in materials 244. As more types of variations are included in training data 236, the accuracy of material properties 204 output by machine learning model 234 can increase. As a result, depending on the makeup of training data 236, machine learning model 234 can estimate material properties 204 with a desired level of accuracy.

In the illustrative example, estimated values for material properties 204 may be, in some cases, based on limited data which may not include a standard deviation and instead provide an estimated error band, while actual values are based on extensive data, which provides a measure of both average and standard deviation.

Further, the variations from a material of interest can be used in training data 236. These variations may include, for example, with metals, differences in percentages of a metal in a metal alloy, purities, or other properties. With composites, differences in amounts of resin, angles, or other parameters for a composite material of interest can be introduced. These variations can aid in increasing an ability of machine learning model 234 to output material properties 204 as predictive allowable 248.

The set of material properties 204 for structure 206 determined using machine learning model 234 can be predictive allowable 248. For example, structure 206 can be comprised of a set of materials 205 including material 252. In this example, material 252 is predictive allowable 248 of samples 240 in training data 236 in which material 252 in the set of materials 205 for structure 206 is different from the set of materials 244 in samples 240. In other words, machine learning model 234 can determine the set of material properties 204 in which structure 206 includes material 252 which is not in the set of materials 244 for samples 240 that were tested to obtain results 238 used to generate training data 236. Thus, machine learning model 234 does not have to be trained with every material for which machine learning model 234 estimates a set of material properties 204.

For example, the set of materials 244 for samples 240 may be sufficiently close to materials 205 in structure 206 such that machine learning model 234 is capable of estimating a set of material properties 204. Differences between materials 205 can include at least one of a purity of a metal, percentages of metals in alloys, an orientation of layers for composites, or a number of composite layers.

When the material is a composite material, the number of layers in the orientation of layers may change. As another example, the types of fibers and resins may also change but may be sufficiently similar to fibers and resins in samples 240 that enable machine learning model 234 to estimate a set of material properties 204 with a desired level of accuracy.

In these illustrative examples, in determining a set of material properties 204, machine learning model 234 can also determine confidence level 254 for the set of material properties 204. If confidence level 254 is within a desired threshold, then predictive allowable 248 is present. Confidence level 254 can be expressed as a percentage, a numerical value, or by a descriptor.

In the illustrative example, an actual property is based on having sufficient test data so that the values for material properties 204 output by machine learning model 234 no longer change with additional testing. In the illustrative example, the actual material property is an average of the actual properties. Further, in the illustrative example, any given physical part can vary from the design. For example, the variation may occur because of at least one of a manufacturing inconsistency, a process inconsistency, an age of a material, or other factors.

In the illustrative example, estimated values are based on limited data which may not include a standard deviation and instead provide an estimated error band, while actual values are based on extensive data, which provides a measure of both average and standard deviation. As a result, machine learning model 234 can output an estimate of material properties 204, actual zero properties, or both depending on the training data used to train machine learning model 234.

Figure 3:
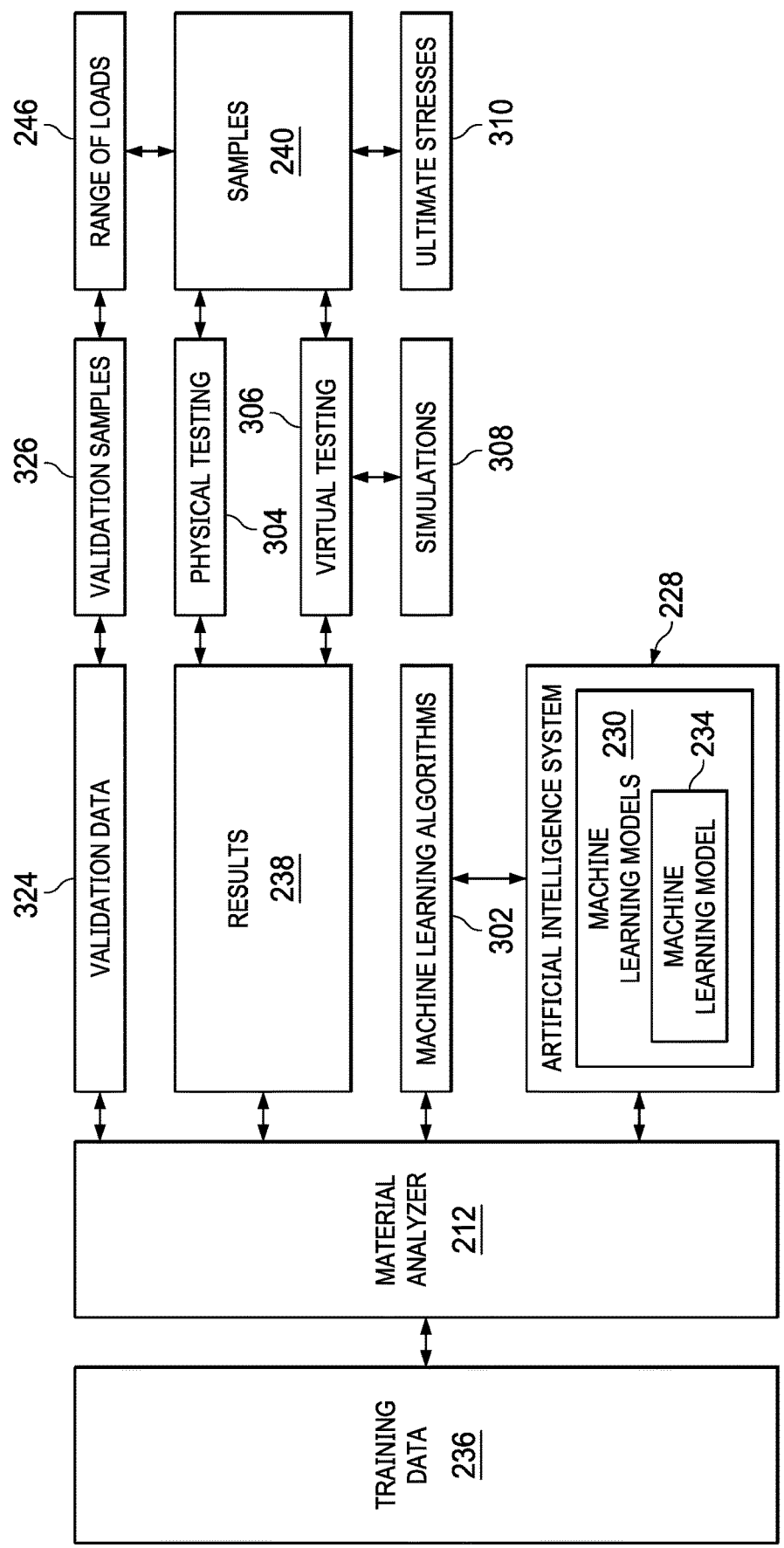
FIG. 3 is an illustration of a block diagram of a data flow for training a machine learning model in accordance with an illustrative embodiment.

With reference next to FIG. 3, an illustration of a block diagram of a data flow for training a machine learning model is depicted in accordance with an illustrative embodiment. In the illustrative examples, the same reference numeral may be used in more than one figure. This reuse of a reference numeral in different figures represents the same element in the different figures.

In this illustrative example, material analyzer 212 in computer system 210 in FIG. 2 is configured to train machine learning models 230 in artificial intelligence system 228. Material analyzer 212 is a component that performs operations such as at least one of creating training data 236 or managing training of machine learning models 230.

In the illustrative example, machine learning models 230 can be trained by material analyzer 212 using various types of machine learning algorithms 302. Machine learning algorithms 302 include at least one of a supervised learning, an unsupervised learning, a feature learning, a sparse dictionary learning, an anomaly detection, association rules, or other types of learning algorithms.

Examples of machine learning models 230 include at least one of an artificial neural network, a decision tree, a support vector machine, a Bayesian network, a genetic algorithm, and other types of models. These machine learning models can be trained using training data 236 and process additional data to provide a desired output.

For example, material analyzer 212 can train machine learning model 234 in machine learning models 230 to determine material properties 204 in FIG. 2 using training data 236 generated from results 238. In the illustrative example, training data 236 can be generated by at least one of material analyzer 212 or user input 226 from human machine interface 218 operated by human operator 216 in FIG. 2. All or some portion of results 238 can be used in creating training data 236. Further, training data 236 can also include other information that may not be included in results 238 such as weights for results 238, environmental conditions for testing, whether a particular result was generated from a physical test for a simulation of samples 240, information about samples 240, or other suitable information that can be used by machine learning algorithms 302 to train machine learning model 234. The information about a sample can include information in addition to an identification of the type of material in the sample. For example, at least one of configurations or dimensions of a sample can be included in training data 236.

In this illustrative example, results 238 of testing samples 240 can be obtained in a number of different ways. For example, results 238 can be obtained from testing in the form of physical testing 304 of samples 240. As depicted, results 238 from physical testing 304 of samples 240, such as test coupons, can comprise at least one of coupon test data, standard coupon test data, non-standard coupon test data, or some other suitable type of data. For example, results 238 can be results from testing physical test coupons when physical testing 304 of samples 240 is performed.

Results 238 can also be obtained from testing performed through virtual testing 306 performed using simulations 308. Simulations 308 can be performed using finite element method (FEM) models that are created from running simulations 308. The simulation can be used to obtain results 238 for a set of materials 244 in FIG. 2 that are simulated using the finite element method models. For example, results 238 can be results from testing test coupons using a simulation when virtual testing 306 is performed. Virtual testing 306 can provide results 238 in the form of at least one of simulation standard coupon test data or simulation non-standard coupon test data.

In the illustrative example, the testing to obtain results 238 is performed over range of loads 246. In this illustrative example, range of loads 246 can be continuous loads or non-continuous loads. Non-continuous loads can have one or more gaps between the loads in range of loads 246. In one illustrative example, range of loads 246 can be from before and after ultimate stresses 310 are applied to samples 240. In other words, testing can be performed for samples 240 over range of loads 246 from before and after ultimate stresses 310 are applied to samples 240.

In this illustrative example, an ultimate stress is a maximum value of stress that a material can resist. After the ultimate stress is reached, the material starts losing its strength and offers less resistance and eventually breaks or fails.

As depicted, samples 240 can be tested to obtain results 238 that include mechanical properties of the material such as a Young's modulus, a strength, a fracture toughness, a fatigue life, and other properties. Results 238 can include quantitative as well as qualitative results. Quantitative results can provide data used for design purposes as well as certification. Qualitative tests can provide data that can be used for comparison purposes.

These tests include applying range of loads 246 to samples 240. These loads in range of loads 246 can include at least one of tension, compression, embedding, or some other type of load. Results 238 can also include the application of these loads under various operating environments. For example, the operating environments can include humidity, temperature, corrosive fluids, impacts, or other environmental conditions.

Additionally, material analyzer 212 can also validate machine learning model 234 after training machine learning model 234. This validation can be performed by material analyzer 212 using validation data 324 obtained from results 238 of testing validation samples 326. Range of loads 246 can be applied to validation samples 326. Validation samples 326 can be, for example, validation coupons.

In the illustrative example, one machine learning model is trained for a single material. Further, a machine learning model can be trained for determining material properties of materials that are considered to be sufficiently similar. For example, a machine learning model can be trained to output material properties for a metal alloy such as a nickel iron alloy in which different types of materials are different percentages of nickel and iron. As another example, a machine learning model can be trained to output material properties for a composite in which the composite has variations in a number of layers within a selected range of layers.

For example, a similarity between materials can depend on at least one of the available processing resources or desired level of accuracy. Further, the training and validation of machine learning models 230 can be performed periodically after the initial training.

At least one of material analyzer 212 or artificial intelligence system 228 can be implemented in software, hardware, firmware, or a combination thereof. When software is used, the operations performed by at least one of material analyzer 212 or artificial intelligence system 228 can be implemented in program code configured to run on hardware, such as a processor unit. When firmware is used, the operations performed by at least one of material analyzer 212 or artificial intelligence system 228 can be implemented in program code and data and stored in persistent memory to run on a processor unit. When hardware is employed, the hardware can include circuits that operate to perform the operations in at least one of material analyzer 212 or artificial intelligence system 228.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

With respect to being trained to output material properties 204 for a particular material, machine learning model 234 can also output material properties 204 in the form of predictable allowable 248 when another material is input into machine learning model 230 that is sufficiently similar to the particular material for which machine learning model 230 was trained.

Further, the input of the material that is sufficiently close to the material for which machine learning model 234 has been trained can be used as training data 236. As a result, machine learning model 234 can be continuously trained when similar materials are used. In this manner, a machine learning model trained to output material properties 204 for a particular material can over time learn to output material properties 204 for other types of materials that are similar to the material for which the machine learning model was originally trained to process.

In the illustrative example, a material may be considered to be similar or sufficiently close when a desired level of accuracy of material properties 204 is present for a material that is not the same material used for training. This determination of accuracy can be made using validation data 324 for which material properties 204 are known for the similar material that is to be input into machine learning model 234.

Figure 4:
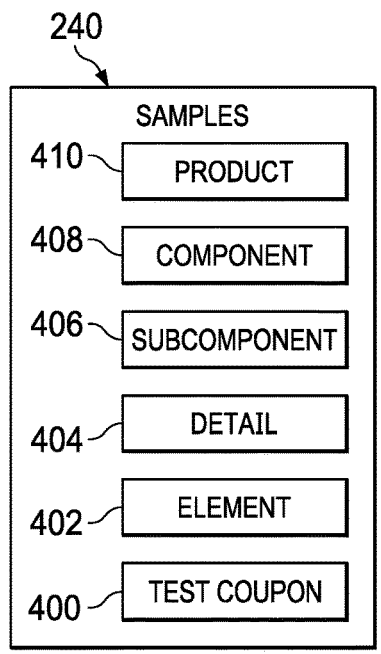
FIG. 4 is an illustration of a block diagram of types of samples in accordance with an illustrative embodiment.

With reference now to FIG. 4, an illustration of a block diagram of types of samples is depicted in accordance with an illustrative embodiment. In this illustrative example, samples 240 used in testing to generate results 238 for training data 236 in FIG. 2 can take a number of different forms. These types of samples 240 can also be used in generating training data 236 in FIG. 3.

For example, samples 240 can have different levels of complexity. For example, samples 240 can be selected from at least one of test coupon 400, element 402, detail 404, subcomponent 406, component 408, product 410, or some other type of sample. In this illustrative example, samples 240 are listed in the order of complexity. As depicted, the order of complexity increases from test coupon 400 to product 410 with test coupon 400 being the simplest level of complexity and product 410 being the highest level of complexity. Additionally, test coupon 400 and element 402 are generic specimens. In this example, detail 404, subcomponent 406, and component 408 are non-generic specimens.

In the illustrative example, test coupon 400, element 402, and detail 404 are more commonly used types of samples 240 when training a machine learning model. In some examples, element 402 and detail 404 may be referred to as non-standard coupons. Higher-level complexity samples can be used in some cases depending on the particular detail, subcomponents, or components.

Test coupon 400 is a small test specimen relative to other types of samples 240. Test coupon 400 can be a flat sample of material. In terms of size, test coupon 400 can be, for example, about 100 mm to about 200 mm long and about 10 mm to about 50 mm wide.

Element 402 is a structural member or element that is more complex than test coupon 400. Element 402 is a structure that has a shape and dimensions representative of a load transfer structure that can be used in subcomponent 406, component 408, product 410.

Element 402 can be, for example, a laminate, a panel, a facesheet, an angle bracket, a cleat, a spar, a load transfer structure, a bracket, or some other type of specimen. In this illustrative example, element 402 does not include specific details such as openings, holes, channels, or other features that may be present in actual use.

In the illustrative example, detail 404 is a structure with design details. Detail 404 can be a version of element 402 with details. For example, detail 404 can be element 402 that includes details such as holes, channels, grooves, textured surfaces, or other types of details.

As depicted, subcomponent 406 is a three-dimensional structure comprised of two or more elements. For example, subcomponent 406 can be a splice, a joint, a fitting, a portion of a bulkhead, a step box, a stiffened wing panel, a body panel with frames, a shear web, and other suitable types of subcomponents.

In the illustrative example, component 408 can be comprised of subcomponents and can be a portion of a product such as a section of an airframe structure. For example, component 408 can be a wing, a fuselage section, a stabilizer, or some other structure. Component 408 can be a structure for a product that can be tested as a complete unit to qualify the structure for certification or other quality testing purposes.

Further, samples 240 can include product 410. Product 410 is an object from which materials are being selected to manufacture the object. Product 410 can be, for example, a fitting, a bolt, a clamp, a landing gear assembly, a door, a vehicle, an aircraft, or some other suitable type of product.

Depending on the size and complexity of product 410, product 410 may be suitable for use as a sample in samples 240.

Further, the samples for a material of interest may have different levels of complexity. Further, within the same level of complexity, a sample may have variations. For example, test coupons may have different shapes and dimensions. As another example, details may have variations such as hole size, a number of holes, or hole placement. Additionally, multiple test coupons expected to have the same dimensions may be tested in case variations are present in those test coupons. In other words, the different samples may also include manufacturing variations. In this manner, the test data generated using samples 240 with variations on one or more levels of complexity can provide a more accurate output for a machine learning model. As another example, the variations in testing may also occur for samples of the same dimensions for a particular material when generating training data 236.

Figure 5:
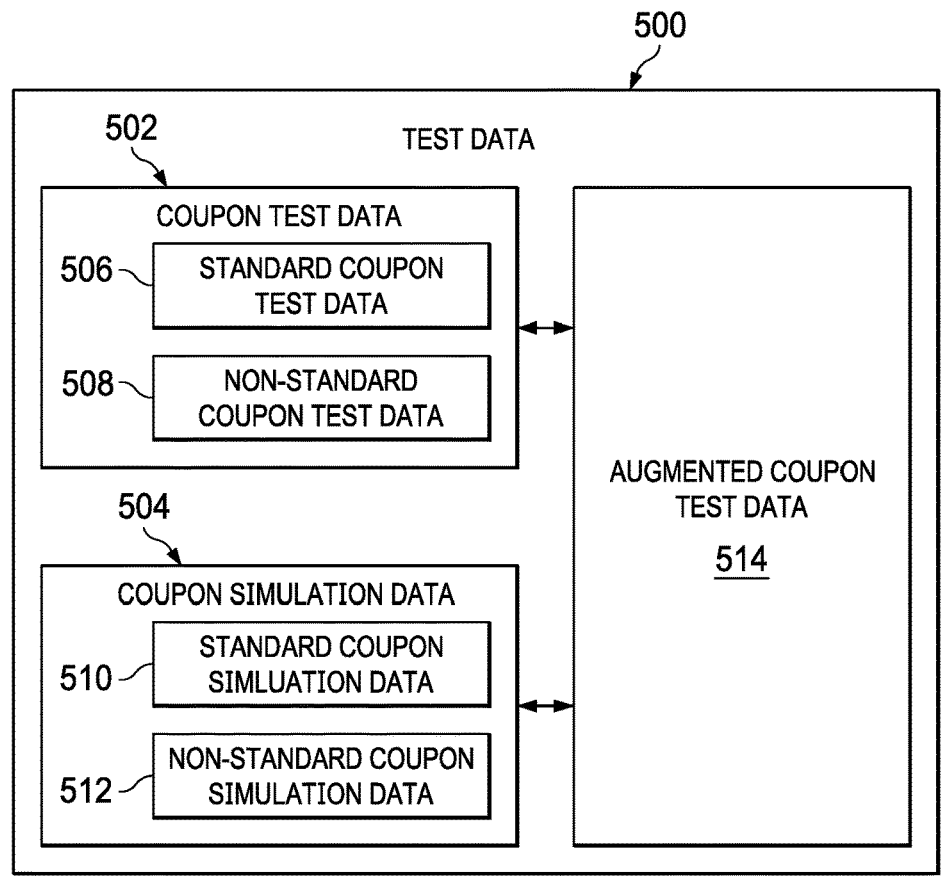
FIG. 5 is an illustration of types of data for test coupons in accordance with an illustrative embodiment.

With reference now to FIG. 5, an illustration of types of data for test coupons is depicted in accordance with an illustrative embodiment. In this this figure, examples of types of data that can be generated for samples such as test coupon 400 in FIG. 4 are shown. These types of data can be used in training data 236 to train machine learning model 234 in FIGS. 2-3.

As depicted, test data 500 may comprise at least one of coupon test data 502 or coupon simulation data 504. In this illustrative example, coupon test data 502 is test data 500 obtained from physical testing of test coupons. As depicted, coupon simulation data 504 is test data 500 obtained from simulations of the test coupons.

In this illustrative example, standard coupon test data 506 and non-standard coupon test data 508 are types of coupon test data 502. In other words, standard coupon test data 506 and non-standard coupon test data 508 are generated from physical testing of the test coupons.

In this illustrative example, standard coupon test data 506 is data generated from results of testing test coupons that have a standard or uniform size. The shape of a test coupon that generates standard coupon test data 506 when tested can be, for example, a rectangular bar, a round specimen, a sheet-type specimen, or other suitable shapes.

The test coupons can be comprised of many different materials to generate standard coupon test data 506. These materials can be, for example, a metal, an alloy, a composite material, a polymer, or other suitable types of materials that may be used in a structure.

As depicted, non-standard coupon test data 508 is test data generated from testing test coupons that have advanced shapes. In other words, the test coupons used to generate non-standard coupon test data 508 can have different shapes and features that are more complex as compared to standard test coupons.

For example, a non-standard test coupon may be element 402 or detail 404 in FIG. 4. For example, this type of test coupon may have holes, textures, angled shapes, curved shapes, irregular shapes, or other features. Further, a non-standard test coupon may be a shape that is similar or corresponds to a shape of a part in a structure.

In this illustrative example, coupon simulation data 504 can include at least one of standard coupon simulation data 510 or non-standard coupon simulation data 512. The simulation of test coupons can save time and effort used to perform physical testing of the test coupons.

As depicted, standard coupon simulation data 510 is generated from a simulation of a standard test coupon. In this example, non-standard coupon simulation data 512 can be generated using the simulation of a non-standard test coupon.

In this illustrative example, the simulations of these types of test coupons may be performed using a finite element analysis method in which a finite element analysis model is generated for each test coupon of interest.

Further, test data 500 can also include augmented coupon test data 514. This type of test data is a result from hybrid physics in which some of the test data is obtained from actual physical testing of the test coupons while other portions of the test data are obtained from simulations of the test coupons. As depicted, augmented coupon test data 514 includes both coupon test data 502 and coupon simulation data 504.

These different types of test data are examples of training data 236 that can be used to train machine learning model 234 in FIGS. 2-3. The use of augmented coupon test data 514 can also decrease the amount of physical testing needed to obtain material properties 204 in FIG. 2 for the test coupons. The types of data in this figure can also be generated using other types of samples 240 in FIGS. 2-3 in addition to or in place of samples at the level of test coupon 400 in FIG. 4.

With the use of augmented coupon test data 514, different portions of coupon test data 502 and coupon simulation data 504 can be used. For example, without limitation, augmented coupon test data 514 can comprise 90 percent to 10 percent of augmented coupon test data 514 being from a physical testing of the test coupons for the set of materials over a range of loads from before and after ultimate stresses, and 10 percent to 90 percent of augmented coupon test data 514 being from a simulation of the test coupons for the set of materials over the range of loads from before and after the ultimate stresses are applied to the test coupons.

In other examples, other percentages of augmented coupon test data 514 can be present between augmented coupon test data 514 being from a physical testing of the test coupons for the set of materials over a range of loads from before and after ultimate stresses and augmented coupon test data 514 being from a simulation of the test coupons for the set of materials over the range of loads from before and after the ultimate stresses are applied to the test coupons. For example, augmented coupon test data 514 can comprise 5 percent of augmented coupon test data 514 being from a physical testing of the test coupons for the set of materials over a range of loads from before and after ultimate stresses, and 95 percent of augmented coupon test data 514 being from a simulation of the test coupons for the set of materials over the range of loads from before and after the ultimate stresses are applied to the test coupons.

Thus, training data 236 in FIGS. 2-3 can be comprised of various permutations of test data 500 and can be selected from at least one of one of coupon test data 502, coupon simulation data 504, standard coupon test data 506, non-standard coupon test data 508, standard coupon simulation data 510, non-standard coupon simulation data 512, or augmented coupon test data 514 including coupon test data 502 and coupon simulation data 504. These different types of test data 500 can include data using range of loads 246 in FIGS. 2-3 before and after ultimate stresses 310.

In one example, training data 236 in FIGS. 2-3 can comprise standard coupon test data 506. In another example, training data 236 can comprise non-standard coupon test data 508. In another illustrative example, training data 236 can comprise standard coupon simulation data 510. In yet another example, training data 236 can comprise non-standard coupon simulation data 512.

In still another example, training data 236 can comprise augmented coupon test data 514. In this example, augmented coupon test data 514 is comprised of coupon test data 502 and standard coupon simulation data 510. Different portions of coupon test data 502 and standard coupon simulation data 510 can be used in different implementations. In one example, a proportion can be, for example, 50 percent of coupon test data 502 and 50 percent of standard coupon simulation data 510.

In another illustrative example, training data 236 can comprise augmented coupon test data 514. In this particular example, augmented coupon test data 514 comprises non-standard coupon test data 508 and non-standard coupon simulation data 512. The proportion of the types of test data 500 can vary in different examples.

In yet another illustrative example, training data 236 can comprise standard coupon test data 506 and non-standard coupon test data 508. As yet another example, training data 236 can comprise standard coupon simulation data 510 and non-standard coupon simulation data 512.

In still another illustrative example, training data 236 can comprise coupon test data 502 and coupon simulation data 504. In this example, training data 236 includes standard coupon test data 506, non-standard coupon test data 508, standard coupon simulation data 510, and non-standard coupon simulation data 512. In this example, 25 percent of each type of test data 500 is present. Of course, other portions of test data 500 may be used in other examples.

In another illustrative example, training data 236 can comprise standard coupon simulation data 510 and non-standard coupon simulation data 512. These other permutations of different types of test data 500 may be used in creating training data 236.

In the illustrative example, different types of tests can be used to generate test data 500. For example, standard tests can provide test data 500, such as standard coupon test data 506, for a design. This type of test data 500 can be, for example, standard strength and stiffness data in tension, compression, or shear.

In the illustrative example, non-standard tests provide test data 500 such as material data or parameters needed for finite element models or simulation material models of samples such as non-standard coupons. For example, a punch shear test, which pushes a punch through a composite plate, is used to provide material parameters for model such as LS-Dyna MAT 162 that can be run by LS-DYNA, which is an advanced general-purpose multi-physics simulation software package. These parameters are not determined through standard tests. The parameters are correlated to provide a best fit with non-standard test data.

Another non-standard test example is angle of fracture. This data is used in finite element simulations to predict damage initiation and propagation. This fracture angle is determined with non-standard laterally constrained compression tests, which look at the fracture angle through the thickness during compressive failure. Thus, this fracture angle is not a standard material property that is used in infinite element models.

In these illustrative examples, non-standard tests are mostly used in calibrating finite element material models to generate simulation data such as non-standard coupon simulations data 512 in test data 500. Some exceptions can occur when, for example, non-standard tests may be needed to examine certain interface design features. These interface design features can include bonding of composite structures to a metal such as titanium. As a result, non-standard tests are used in calibrating finite element models to generate test data 500, while standard tests provide data for design value limits in test data 500.

In one illustrative example, one or more technical solutions are present that overcome a technical problem with determining material properties of materials for use in a structure. As a result, one or more technical solutions can provide a technical effect enabling a determination of the material properties for the materials without performing actual tests on test coupons. One or more technical solutions provide a machine learning model that has been trained using results from prior tests of the test coupons. With this training, predictable allowables can occur in which estimates of the material properties for a material can be determined by the machine learning model even though the machine learning model was not trained using results from that particular type of material.

One or more technical solutions enable designing products using a Building Block Approach (BBA) that reduces a number of large-scale tests such as those for completed wing assemblies, fuselages, or other components while reducing the number of tests needed for physical coupons. In other words, the use of machine learning model 234 in the illustrative example enables producing design data from a coupon level all the way up to the product or portion of the product in which testing is performed on the coupon level to obtain material properties needed for designing structures at a subcomponent or component level.

For example, the use of machine learning model 234 trained with training data 236 for results 238 in FIGS. 2-3 enables predicting or obtaining material properties for many materials without having to perform tests. These material properties can be used in models for structures created to simulate the performance of the structures using the materials.

With more information on material properties obtained using machine learning model 234, one or more technical solutions enable more accurately modeling how a structure will respond to events such as a bird strike, heat, a lightning strike, an impact, or other events when using different materials for the structure. In one illustrative example, training data 236 obtained from results of hybrid physics in which samples 240 of a set of materials 244 that have been physically tested, simulated, or both physically tested and simulated, enable machine learning model 234 to predict material properties 204 without having additional testing information.

Computer system 210 can be configured to perform at least one of the steps, operations, or actions described in the different illustrative examples using software, hardware, firmware, or a combination thereof. As a result, computer system 210 operates as a special purpose computer system in which material analyzer 212 in computer system 210 enables estimating material properties for a structure. In particular, material analyzer 212 transforms computer system 210 into a special purpose computer system as compared to currently available general computer systems that do not have material analyzer 212.

In the illustrative example, the use of material analyzer 212 in computer system 210 integrates processes into a practical application for estimating material properties that increases the performance of computer system 210. In other words, material analyzer 212 in computer system 210 is directed to a practical application of processes integrated into material analyzer 212 in computer system 210 that trains a machine learning model using training data comprising results of tests of samples. These samples can test coupons but also can take other forms such as elements or details. In this illustrative example, material analyzer 212 in computer system 210 trains machine learning model 234 such that machine learning model 234 can provide estimates of material properties with a desired level of accuracy. These estimates can even be provided for materials that were not used in training machine learning model 234. In this manner, machine learning model 234 in computer system 210 provides a practical application of operations for estimating the material properties for a structure, thus improving the function of computer system 210. For example, computer system 210 can identify the material properties for structures using machine learning model 234 instead of accessing a database which may not include materials of interest for the structure.

The illustrations of material characterization environment and the different components in this environment in FIGS. 2-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although validation data 324 is shown as being obtained from validation samples 326, which are depicted to be separate components from training data 236 generated from results 238 of testing samples 240 in FIG. 3, validation data 324 can be a portion of training data 236 selected for use in validating machine learning models 230. This portion of training data 236 is not used in training machine learning model 234 and is reserved to validate the operation of machine learning model 234. For example, 80 percent of training data 236 can be used for training and 20 percent of training data 236 can be reserved for use as validation data 324. In this example, both training data 236 and validation data 324 include uncertainty and test variability.

As another example, new training data can be generated from at least one of physical testing or virtual testing. In other examples, new training data may be obtained based on feedback from analysis of material properties 204 output by machine learning model 234. This new training data can be used to provide additional training for machine learning model 234.

This additional training may improve the accuracy for speed at which machine learning model 234 outputs material properties 204. This type of training may be performed any number of times.

Figure 6:
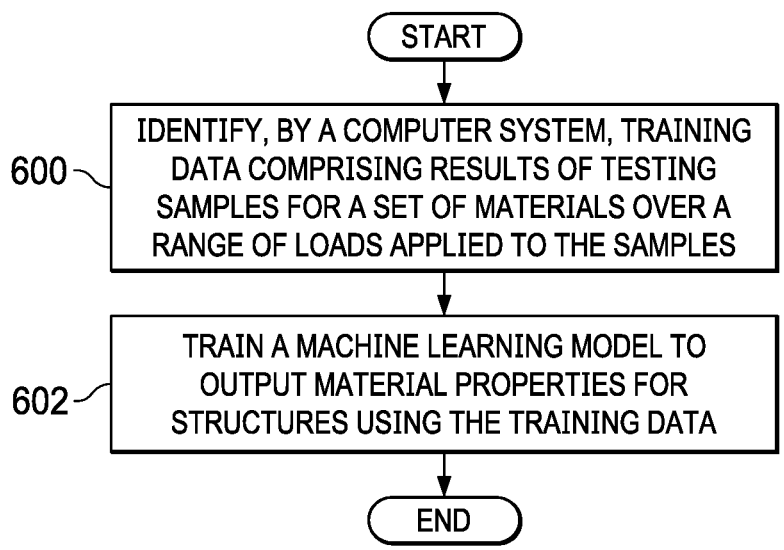
FIG. 6 is an illustration of a flowchart of a process for estimating material properties in accordance with an illustrative embodiment.

Turning next to FIG. 6, an illustration of a flowchart of a process for estimating material properties is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in material analyzer 212 in computer system 210 in FIG. 2.

The process begins by identifying, by a computer system, training data comprising results of testing samples for a set of materials over a range of loads applied to the samples (operation 600). In operation 600, the training data can comprise results of testing the samples for the set of materials over the range of loads applied to the samples. This training data can be selected from at least one of coupon test data, standard coupon test data, non-standard coupon test data, coupon simulation data, standard coupon simulation data, non-standard coupon simulation data, or augmented coupon test data including coupon test data, coupon simulation data, or other types of results.

In operation 600, the results of testing the samples can comprise at least one of results of a simulation of the samples or results of physical testing of the samples.

The process trains a machine learning model to output material properties for structures using the training data (operation 602). The process terminates thereafter. As a result, the machine learning model can estimate the material properties after training using the training data.

Figure 7:
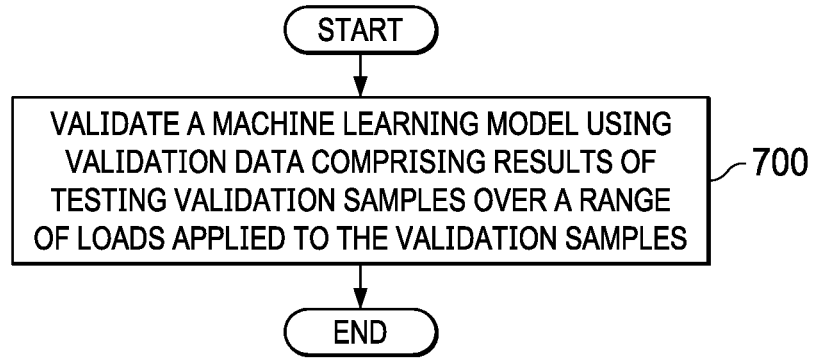
FIG. 7 is an illustration of a flowchart of a process for validating training of a machine learning model in accordance with an illustrative embodiment.

With reference now to FIG. 7, an illustration of a flowchart of a process for validating training of a machine learning model is depicted in accordance with an illustrative embodiment. This flowchart depicts an additional operation that can be performed in the process illustrated in the flowchart in FIG. 6. The operation in this process can be performed after training of the machine learning model in operation 602 in FIG. 6.

The process validates a machine learning model using validation data comprising results of testing validation samples over a range of loads applied to the validation samples (operation 700). The process terminates thereafter. In this example, the validation data may not include information such as weights to provide an unbiased evaluation of the machine learning model. The validation data may also include data that was not used in training the machine learning model in this illustrative example. For example, the results of physical testing and from simulations may be partitioned such that a portion of the results is used for training data while the other portion of the results is used as validation data.

Figure 8:
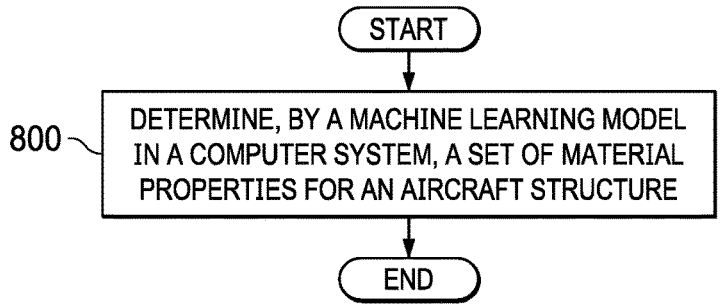
FIG. 8 is another illustration of a flowchart of a process for estimating material properties in accordance with an illustrative embodiment.

With reference now to FIG. 8, another illustration of a flowchart of a process for estimating material properties is depicted in accordance with an illustrative embodiment. This flowchart depicts an additional operation that can be performed in the process illustrated in the flowchart in FIG. 6. The operation in this process can be performed after training of the machine learning model in operation 602 in FIG. 6.

The process determines, by a machine learning model in a computer system, a set of material properties for an aircraft structure (operation 800). The process terminates thereafter.

Figure 9:
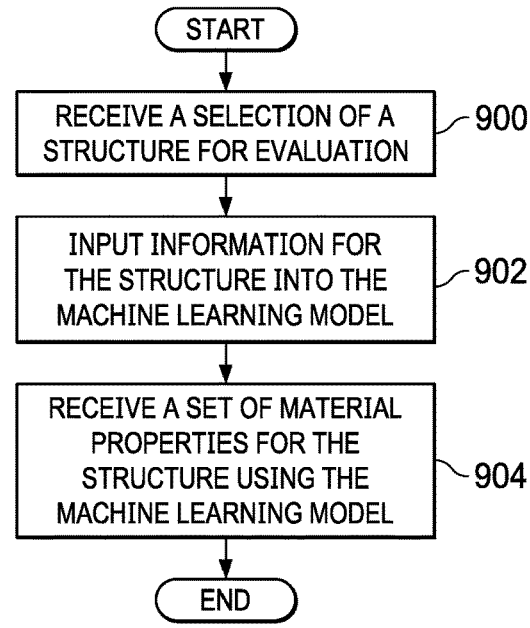
FIG. 9 is yet another illustration of a flowchart of a process for estimating material properties in accordance with an illustrative embodiment.

With reference now to FIG. 9, yet another an illustration of a flowchart of a process for estimating material properties is depicted in accordance with an illustrative embodiment. The process in this flowchart is an example of an implementation for operation 800 in FIG. 8.

The process begins by receiving a selection of a structure for evaluation (operation 900). The selection can be based on user input selecting the structure. In other illustrative examples, the selection can be made by a material analyzer selecting structures from a design of a product for analysis. In this illustrative example, the structure can take a number of different forms. For example, the structure can be an element, a detail, a subcomponent, a component, or a product. The component can include a single structure, an assembly, a subassembly, and other systems or types of structures for a product.

The process inputs information for the structure into the machine learning model (operation 902). The process receives a set of material properties for the structure using the machine learning model (operation 904). The process terminates thereafter.

Figure 10:
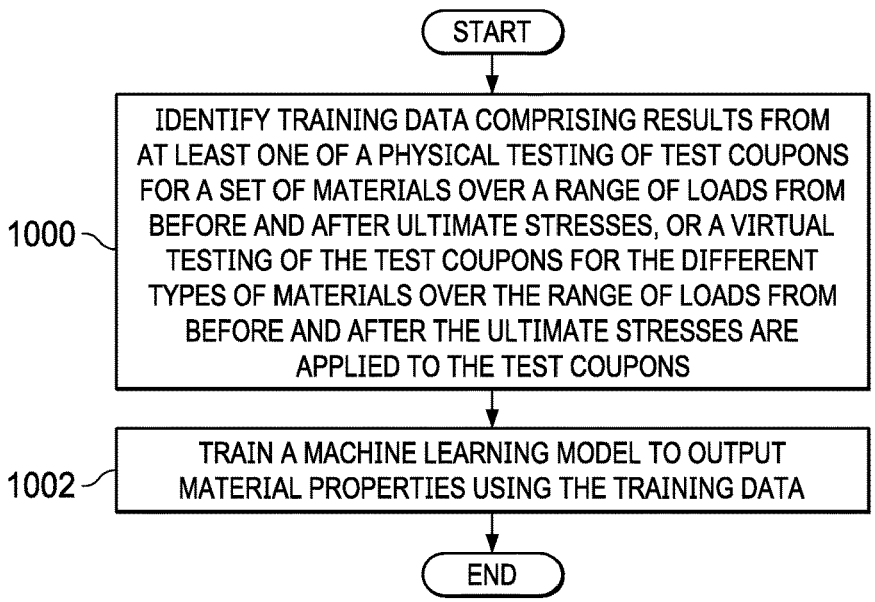
FIG. 10 is still another illustration of a flowchart of a process for estimating material properties in accordance with an illustrative embodiment.

Turning next to FIG. 10, still another illustration of a flowchart of a process for estimating material properties is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in material analyzer 212 in computer system 210 in FIG. 2.

The process begins by identifying training data comprising results from at least one of a physical testing of test coupons for a set of materials over a range of loads from before and after ultimate stresses, or a virtual testing of the test coupons for the different types of materials over the range of loads from before and after the ultimate stresses are applied to the test coupons (operation 1000). In this illustrative example, the set of materials can be a single material or multiple materials of different types depending on the particular implementation. The process trains a machine learning model to output material properties using the training data (operation 1002). The process terminates thereafter. As a result, the machine learning model can estimate the material properties after training using the training data.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
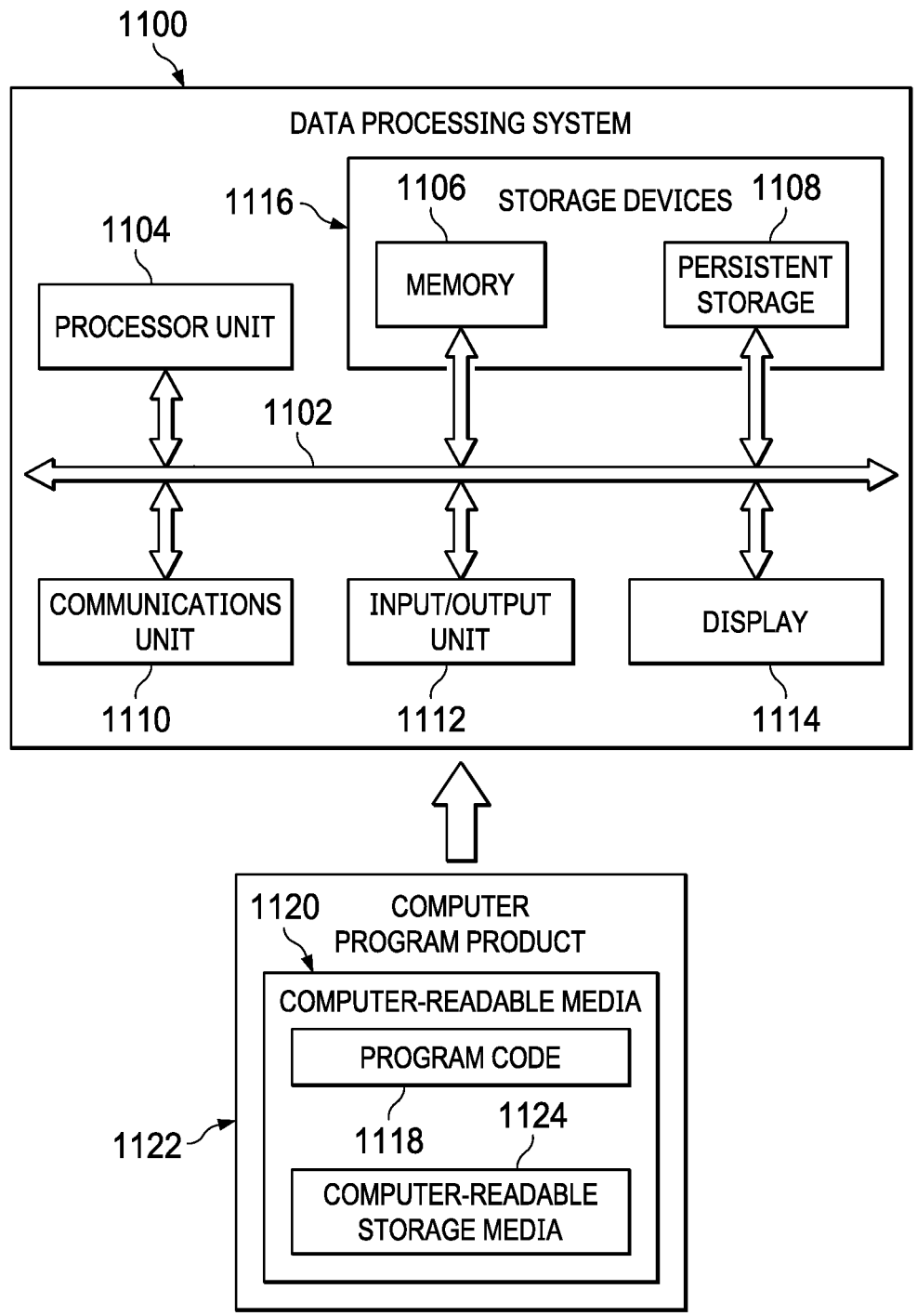
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 210 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage medium, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage medium 1124.

In these illustrative examples, computer-readable storage medium 1124 is a physical or tangible storage device used to store program code 1118 rather than a medium that propagates or transmits program code 1118. Computer readable storage medium 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
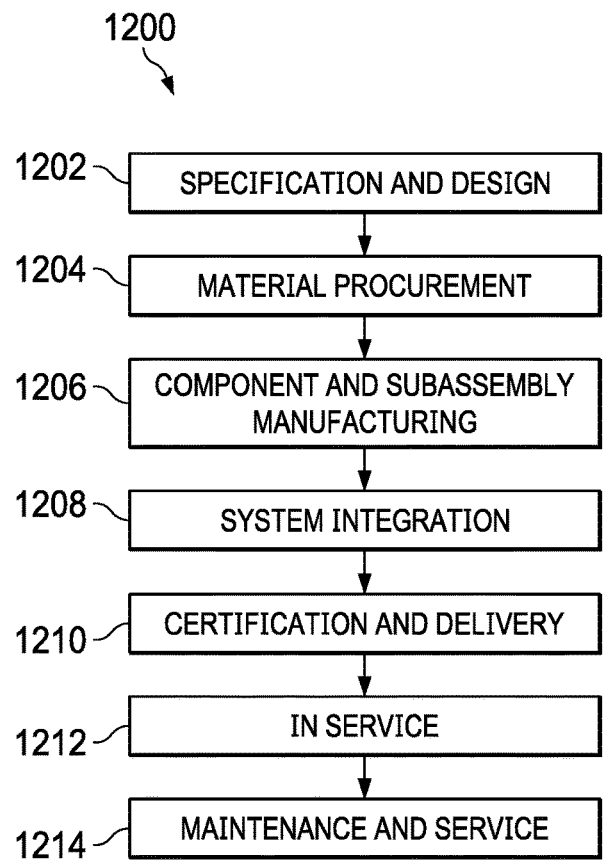
FIG. 12 is an illustration of an aircraft manufacturing and service method in accordance with an illustrative embodiment.
Figure 13:
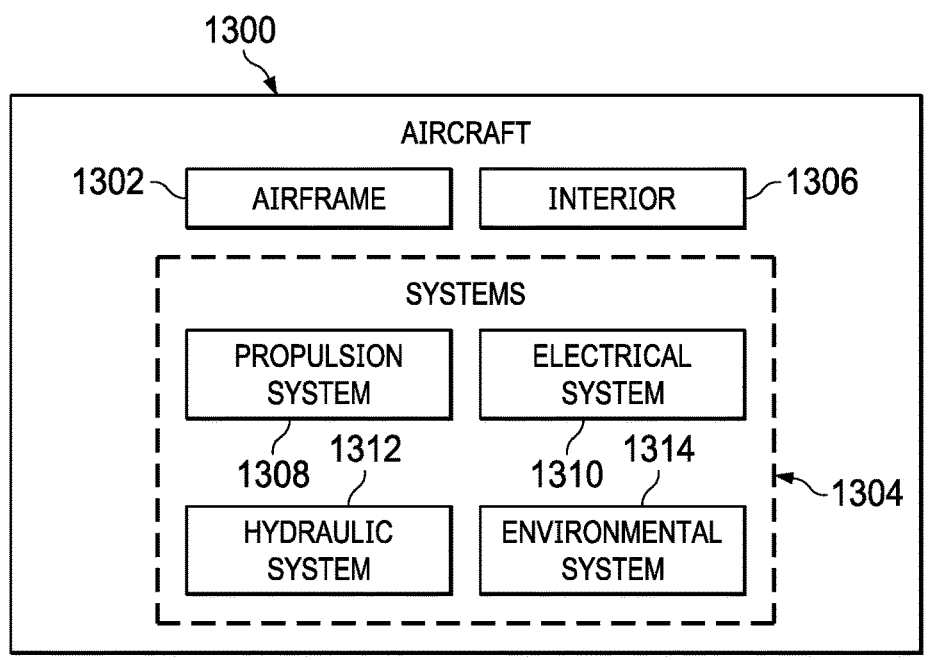
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 can go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 can be fabricated or manufactured in a manner similar to components or subassemblies produced while aircraft 1300 is in service 1212 in FIG. 12. As yet another example, one or more apparatus embodiments, method embodiments, or a combination thereof can be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. The use of a number of the different illustrative embodiments may substantially expedite the assembly of aircraft 1300, reduce the cost of aircraft 1300, or both expedite the assembly of aircraft 1300 and reduce the cost of aircraft 1300.

For example, the number of tests performed on coupons to obtain material properties for use in creating models for modeling structures for aircraft 1300 in specification and design 1202 can be reduced using material analyzer 212 in FIGS. 2-3 with machine learning model 234 in artificial intelligence system 228 to output material properties for the structures that are designed and modeled for aircraft 1300. Further, material analyzer 212 with machine learning model 234 can also be used in other stages of aircraft manufacturing and service method 1200. For example, material properties can be determined for materials used in parts that may be manufactured for use in maintenance and service 1214. Operations in maintenance and service 1214 include, for example, routine maintenance, inspections, upgrades, refurbishment, or other types of maintenance operations in which parts may be manufactured for use.

Figure 14:
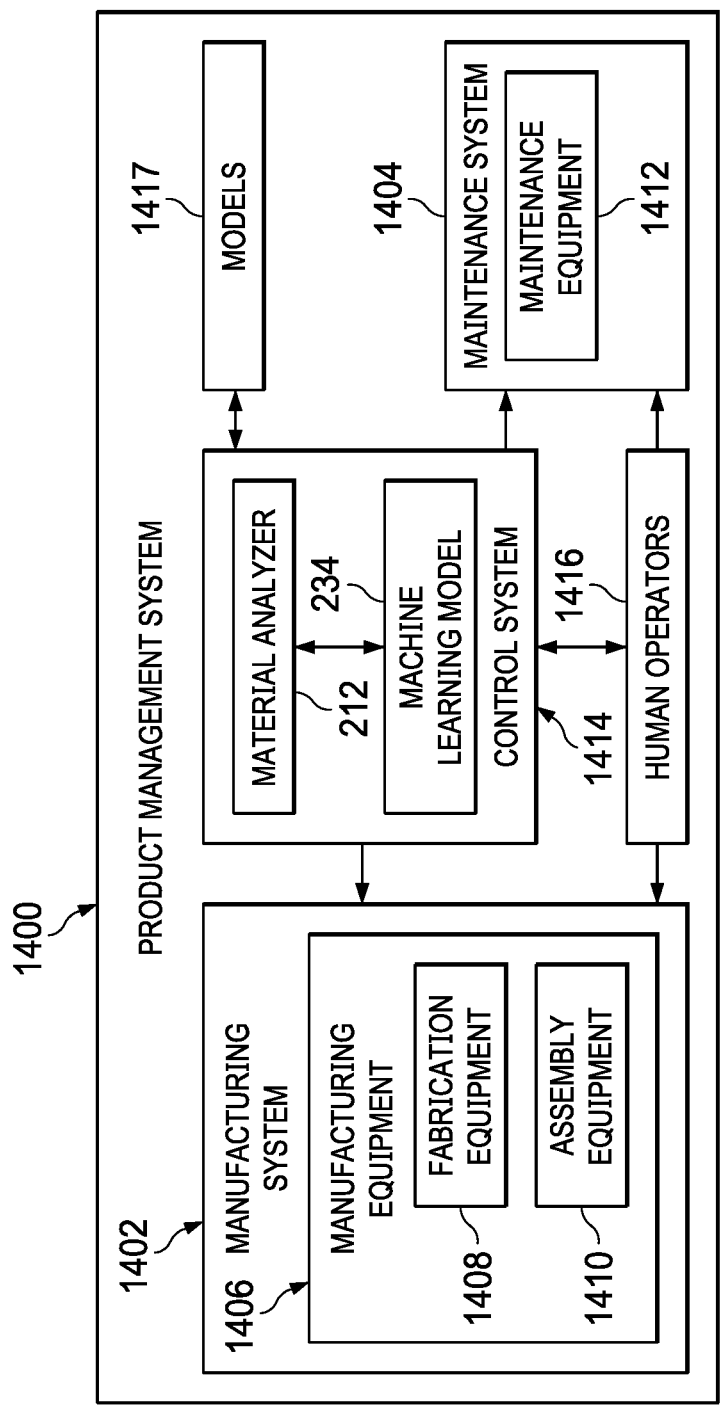
FIG. 14 is an illustration of a block diagram of a product management system is depicted in accordance with an illustrative embodiment.

Turning now to FIG. 14, an illustration of a block diagram of a product management system is depicted in accordance with an illustrative embodiment. Product management system 1400 is a physical hardware system. In this illustrative example, product management system 1400 includes at least one of manufacturing system 1402 or maintenance system 1404.

Manufacturing system 1402 is configured to manufacture products, such as aircraft 1300 in FIG. 13. As depicted, manufacturing system 1402 includes manufacturing equipment 1406. Manufacturing equipment 1406 includes at least one of fabrication equipment 1408 or assembly equipment 1410.

Fabrication equipment 1408 is equipment that used to fabricate components for parts used to form aircraft 1300 in FIG. 13. For example, fabrication equipment 1408 can include machines and tools. These machines and tools can be at least one of a drill, a hydraulic press, a furnace, a mold, a composite tape laying machine, a vacuum system, a lathe, or other suitable types of equipment. Fabrication equipment 1408 can be used to fabricate at least one of metal parts, composite parts, semiconductors, circuits, fasteners, ribs, skin panels, spars, antennas, or other suitable types of parts.

Assembly equipment 1410 is equipment used to assemble parts to form aircraft 1300 in FIG. 13. In particular, assembly equipment 1410 is used to assemble components and parts to form aircraft 1300 in FIG. 13. Assembly equipment 1410 also can include machines and tools. These machines and tools may be at least one of a robotic arm, a crawler, a faster installation system, a rail-based drilling system, or a robot. Assembly equipment 1410 can be used to assemble parts such as seats, horizontal stabilizers, wings, engines, engine housings, landing gear systems, and other parts for aircraft 1300 in FIG. 13.

In this illustrative example, maintenance system 1404 includes maintenance equipment 1412. Maintenance equipment 1412 can include any equipment needed to perform maintenance on aircraft 1300 in FIG. 13. Maintenance equipment 1412 may include tools for performing different operations on parts on aircraft 1300 in FIG. 13. These operations can include at least one of disassembling parts, refurbishing parts, inspecting parts, reworking parts, manufacturing replacement parts, or other operations for performing maintenance on aircraft 1300 in FIG. 13. These operations can be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable devices. In some cases, maintenance equipment 1412 can include fabrication equipment 1408, assembly equipment 1410, or both to produce and assemble parts that needed for maintenance.

Product management system 1400 also includes control system 1414. Control system 1414 is a hardware system and may also include software or other types of components. Control system 1414 is configured to control the operation of at least one of manufacturing system 1402 or maintenance system 1404. In particular, control system 1414 can control the operation of at least one of fabrication equipment 1408, assembly equipment 1410, or maintenance equipment 1412.

The hardware in control system 1414 can be implemented using hardware that may include computers, circuits, networks, and other types of equipment. The control may take the form of direct control of manufacturing equipment 1406. For example, robots, computer-controlled machines, and other equipment can be controlled by control system 1414. In other illustrative examples, control system 1414 can manage operations performed by human operators 1416 in manufacturing or performing maintenance on aircraft 1300. For example, control system 1414 can assign tasks, provide instructions, display models, or perform other operations to manage operations performed by human operators 1416. In these illustrative examples, material analyzer 212 with machine learning model 234 in FIG. 2 can be implemented in control system 1414 to manage at least one of the manufacturing or maintenance of aircraft 1300 in FIG. 13. For example, material analyzer 212 can use machine learning model 234 to determine the general properties for materials that may be used in manufacturing parts or other structures for aircraft 1300. These material properties may be used in creating models for the parts in which the material properties determined using machine learning model 234 enable accurate modeling of how parts may be respond to different loads. In this manner, models of designs for the parts can be finalized and selected for manufacturing by control system 1414 after analyzing the models generated using the material properties determined by material analyzer 212 using machine learning model 234.

In the different illustrative examples, human operators 1416 can operate or interact with at least one of manufacturing equipment 1406, maintenance equipment 1412, or control system 1414. This interaction can occur to manufacture aircraft 1300 in FIG. 13.

Of course, product management system 1400 may be configured to manage other products other than aircraft 1300 in FIG. 13. Although product management system 1400 has been described with respect to manufacturing in the aerospace industry, product management system 1400 can be configured to manage products for other industries. For example, product management system 1400 can be configured to manufacture products for the automotive industry as well as any other suitable industries.

Some features of the illustrative examples are described in the following clauses. These clauses are examples of features not intended to limit other illustrative examples.

Clause 1:

A method for estimating material properties, the method comprising:
identifying, by a computer system, training data comprising results of testing samples for set of materials over a range of loads applied to the samples; and
training, by the computer system, a machine learning model to output material properties for structures using the training data.

Clause 2:

The method of clause 1 further comprising:
determining, by the computer system, a set of the material properties for a structure using the machine learning model trained to output material properties for the structures.

Clause 3:

The method of clause 1 further comprising:
validating, by the computer system, the machine learning model using validation data comprising results of testing validation samples over the range of loads applied to the validation samples.

Clause 4:

The method of clause 3, wherein the validation data comprises the results of testing validation samples for the set of materials over the range of loads from before and after ultimate stresses are applied to the validation samples.

Clause 5:

The method of clause 1, wherein the training data comprises the results of testing samples for the set of materials over the range of loads from before and after ultimate stresses.

Clause 6:

The method of clause 1, wherein the training data comprising the results of testing samples for the set of materials over the range of loads applied to the samples is selected from at least one of a coupon test data, standard coupon test data, non-standard coupon test data, coupon simulation data, standard coupon simulation data, non-standard coupon simulation data, or augmented coupon test data including the coupon test data and the coupon simulation data.

Clause 7:

The method of clause 1, wherein the results of testing samples comprises results of a simulation of the samples.

Clause 8:

The method of clause 1, wherein the results of testing samples comprises results of physical testing of the samples.

Clause 9:

The method of clause 1, wherein the samples are selected from at least one a test coupon, an element, a detail, a subcomponent, a component, or a product.

Clause 10:

The method of clause 2, wherein the structure is comprised of a set of materials including a material that is a predictive allowable of the samples in the training data in which the set of materials is different from the materials, wherein the material is different from the set of materials in the samples.

Clause 11:

The method of clause 1, wherein the set of materials comprises at least one of a metal, a composite, a metal alloy, the composite with a different matrix, or the composite with different fiber orientations.

Clause 12:

A material properties analysis system comprising:

a computer system; and a machine learning model in the computer system, wherein the machine learning model has been trained with training data comprising augmented coupon test data from a physical testing of test coupons for a set of materials over a range of loads from before and after ultimate stresses and a simulation of test coupons for the set of materials over the range of loads from before and after the ultimate stresses are applied to the test coupons, and wherein the machine learning model is configured to output a set of material properties for an aircraft structure.

Clause 13:

The material properties analysis system of clause 12 further comprising:

a material analyzer in the computer system, wherein the material analyzer is configured to:

identify the training data comprising results of testing test coupons for the set of materials over the range of loads applied to the test coupons; and train the machine learning model to output material properties using the training data.

Thus, the illustrative examples provide a method, apparatus, system, and computer program product for determining material properties for materials used in structures. In one or more illustrative examples, these material properties are determined using a machine learning model in an artificial intelligence system. The machine learning model has been trained using training data from results of testing samples.

In the illustrative examples, the samples can be tested using both physical testing and virtual testing resulting in augmented coupon test data. This type of training data reduces the amount of testing needed.

Further, training the machine learning model also provides for a predictive allowable in which material properties can be determined for materials that are not the same as the set of materials used to generate results for the training data. As a result, the material properties can be predicted for similar materials. In the illustrative examples, the machine learning model can also provide a confidence level for the material properties determined for materials of interest. Further, these material properties can be determined not only for a material in the form of a coupon but in other levels of complexity such as an element, a detail, a subcomponent, a component, or even a product.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for estimating material properties, the method comprising:

using a computer system to perform the steps of:

collecting training data comprising results from a datastore, wherein the results are generated from at least one of: physical testing of test coupons for a set of materials over a range of loads from before and after ultimate stresses, or virtual testing of the test coupons for the set of materials over the range of loads from before and after the ultimate stresses are applied to the test coupons;

training a machine learning model to output material properties using the training data; and validating the machine learning model using validation data comprising the results of testing validation coupons over the range of loads applied to the validation coupons.

2. The method of claim 1 further comprising:
using the machine learning model in the computer system to perform the step of:
determining a set of material properties for an aircraft structure.

3. The method of claim 2, wherein the aircraft structure is one of an element, a detail, a subcomponent, a component, and an aircraft.

4. The method of claim 2, wherein the aircraft structure is comprised of a set of materials including a material that is a predictive allowable of the test coupons in the training data in which the material in the set of materials for the aircraft structure is different from the set of materials in the test coupons.

5. The method of claim 1, wherein the results of the physical testing of the test coupons comprise at least one of coupon test data, standard coupon test data, or non-standard coupon test data.

6. The method of claim 1, wherein the results of the virtual testing of the test coupons comprise at least one of standard coupon simulation data or non-standard coupon simulation data.

7. The method of claim 1, wherein the results are augmented coupon test data that comprise 90 percent to 10 percent of the augmented coupon test data being from the physical testing of the test coupons for the set of materials over the range of loads from before and after ultimate stresses and 10 percent to 90 percent of the augmented coupon test data being from a simulation of the test coupons for the set of materials over the range of loads from before and after the ultimate stresses are applied to the test coupons.

8. A system for estimating material properties with a machine learning model trained and validated using the method of claim 1 comprising:
a computer system; and
the machine learning model in the computer system configured to output a set of the material properties for a structure.

9. The method of claim 1, wherein the results of testing the test coupons comprise results of testing the test coupons using a simulation.

10. A material properties analysis system comprising:
a computer system; and
a machine learning model in the computer system, wherein the machine learning model has been trained using training data comprising results from a datastore, wherein the results are generated from testing of test coupons for a set of materials over a range of loads applied to the test coupons, wherein the machine learning model has been validated using validation data comprising the results of testing validation coupons over the range of loads applied to the validation coupons, and wherein the machine learning model is configured to output a set of material properties for a structure.

11. The material properties analysis system of claim 10 further comprising:
a material analyzer in the computer system, wherein the material analyzer is configured to:
collect the training data comprising the results of testing the test coupons for the set of materials over the range of loads applied to the test coupons; and
train the machine learning model to output material properties using the training data.

12. The material properties analysis system of claim 11, wherein the material analyzer is configured to:
validate the machine learning model using validation data comprising the results of testing validation coupons over the range of loads applied to the validation coupons.

13. The material properties analysis system of claim 12, wherein the validation data comprises the results of testing the validation coupons for the set of materials over the range of loads from before and after ultimate stresses are applied to the validation coupons.

14. The material properties analysis system of claim 10, wherein the training data comprises the results of testing the test coupons for the set of materials over the range of loads from before and after ultimate stresses.

15. The material properties analysis system of claim 10, wherein the training data comprising the results of testing the test coupons for the set of materials over the range of loads applied to the test coupons is selected from at least one of coupon test data, standard coupon test data, non-standard coupon test data, coupon simulation data, standard coupon simulation data, non-standard coupon simulation data, or augmented coupon test data including the coupon test data and the coupon simulation data.

16. The material properties analysis system of claim 10, wherein the results of testing the test coupons comprise results of testing the test coupons using a simulation.

17. The material properties analysis system of claim 10, wherein the results of testing the test coupons comprise results of testing physical test coupons.

18. The material properties analysis system of claim 10, wherein an aircraft structure is comprised of a set of materials including a material that is a predictive allowable of samples in the training data in which the material in the set of materials for the aircraft structure is different from the set of materials in the samples.

19. The material properties analysis system of claim 10, wherein the structure is an aircraft structure and the aircraft structure is one of an element, a detail, a subcomponent, a component, and an aircraft.

20. The material properties analysis system of claim 10, wherein the results are augmented coupon test data that comprise 90 percent to 10 percent of the augmented coupon test data being from physical testing of the test coupons for the set of materials over the range of loads from before and after ultimate stresses and 10 percent to 90 percent of augmented coupon test data being from a simulation of the test coupons for the set of materials over the range of loads from before and after the ultimate stresses are applied to the test coupons.

* * * * *